US010941708B2

(12) United States Patent
Schwarz et al.

(10) Patent No.: US 10,941,708 B2
(45) Date of Patent: Mar. 9, 2021

(54) ACOUSTICALLY DAMPED GAS TURBINE ENGINE

(71) Applicant: UNITED TECHNOLOGIES CORPORATION, Farmington, CT (US)

(72) Inventors: Frederick M. Schwarz, Glastonbury, CT (US); Steven D. Sandahl, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 503 days.

(21) Appl. No.: 15/452,632

(22) Filed: Mar. 7, 2017

(65) Prior Publication Data

US 2018/0258856 A1 Sep. 13, 2018

(51) Int. Cl.
*F02C 7/045* (2006.01)
*F01D 25/06* (2006.01)
(Continued)

(52) U.S. Cl.
CPC .............. *F02C 7/045* (2013.01); *F01D 5/26* (2013.01); *F01D 25/06* (2013.01); *F02K 3/06* (2013.01);
(Continued)

(58) Field of Classification Search
CPC . F02C 7/045; F01D 5/26; F01D 25/06; F05D 2260/96; F05D 2300/516;
(Continued)

(56) References Cited

U.S. PATENT DOCUMENTS 3,611,724 A 10/1971 Kutney
3,637,140 A 1/1972 Palovchik
(Continued)

FOREIGN PATENT DOCUMENTS

EP 2017826 A2 1/2009
EP 2251535 A2 11/2010
(Continued)

OTHER PUBLICATIONS

European Search Report for Application No. 18160552.8-1007; dated Jul. 3, 2018; 12 pgs.
(Continued)

*Primary Examiner* — Christopher S Bobish
(74) *Attorney, Agent, or Firm* — Cantor Colburn LLP

(57) ABSTRACT

Disclosed is a gas turbine engine including a fan, a nacelle including a flutter damper forward of the fan, the flutter damper including an acoustic liner having a perforated radial inner face sheet and a radial outer back sheet, the acoustic liner configured for peak acoustical energy absorption at a frequency range that is greater than a frequency range associated with fan flutter, a chamber secured to the radial outer back sheet, the chamber in fluid communication with the acoustic liner, and the chamber configured for peak acoustical energy absorption at a frequency range associated with fan flutter modes, and the engine includes (i) the nacelle and a core cowl forming a convergent-divergent fan exit nozzle; (ii) a variable area fan nozzle capable of being in an opened and closed, the opened position having a larger fan exit area than the closed position; and/or (iii) the fan being shrouded.

8 Claims, 10 Drawing Sheets

(51) Int. Cl.
  *F01D 5/26* (2006.01)
  *F02K 3/06* (2006.01)
  *B65D 33/02* (2006.01)
  *B64D 33/02* (2006.01)
(52) U.S. Cl.
  CPC .. *B64D 2033/0206* (2013.01); *F05D 2260/96* (2013.01); *F05D 2300/516* (2013.01); *Y02T 50/672* (2013.01); *Y02T 50/673* (2013.01)
(58) Field of Classification Search
  CPC . F02K 3/06; B64D 2033/0206; Y02T 50/672; Y02T 50/673
  See application file for complete search history.

(56) References Cited

U.S. PATENT DOCUMENTS

| | | | |
|---|---|---|---|
| 4,084,366 A | 4/1978 | Saylor et al. | |
| 4,235,303 A | 11/1980 | Dhoore et al. | |
| 4,291,080 A * | 9/1981 | Ely | B32B 3/12 428/116 |
| 4,313,524 A | 2/1982 | Rose | |
| 4,441,578 A | 4/1984 | Rose | |
| 4,452,335 A * | 6/1984 | Mathews | F02C 7/24 181/214 |
| 4,531,362 A * | 7/1985 | Barry | F01D 25/06 415/119 |
| 4,692,091 A * | 9/1987 | Ritenour | F04D 29/526 415/119 |
| 4,967,550 A * | 11/1990 | Acton | F01D 25/06 415/119 |
| 5,005,353 A * | 4/1991 | Acton | F01D 17/02 415/119 |
| 5,025,888 A | 6/1991 | Arcas et al. | |
| 5,382,134 A | 1/1995 | Pla et al. | |
| 5,415,522 A * | 5/1995 | Pla | F02C 7/045 415/118 |
| 5,498,127 A * | 3/1996 | Kraft | F02C 7/045 415/119 |
| 5,590,849 A | 1/1997 | Pla | |
| 5,594,216 A * | 1/1997 | Yasukawa | F02C 7/045 181/213 |
| 5,919,029 A | 7/1999 | Van Nostrand et al. | |
| 5,979,593 A * | 11/1999 | Rice | F02C 7/045 181/207 |
| 6,085,865 A * | 7/2000 | Delverdier | B32B 3/12 181/286 |
| 6,379,110 B1 * | 4/2002 | McCormick | B64C 23/00 415/115 |
| 6,634,457 B2 | 10/2003 | Paschereit et al. | |
| 6,811,372 B1 | 11/2004 | Emborg et al. | |
| 6,837,050 B2 * | 1/2005 | Mandai | F23R 3/005 60/725 |
| 7,857,093 B2 * | 12/2010 | Sternberger | B64D 33/02 181/213 |
| 7,870,929 B2 | 1/2011 | Farstad | |
| 8,434,995 B2 | 5/2013 | Pool et al. | |
| 8,506,234 B2 * | 8/2013 | Brooks | F01D 5/16 415/200 |
| 8,578,697 B2 | 11/2013 | Harper | |
| 8,931,588 B2 | 1/2015 | Murray | |
| 9,097,179 B2 * | 8/2015 | Brooks | F01D 5/26 |
| 9,181,875 B2 | 11/2015 | Busekros et al. | |
| 9,546,558 B2 * | 1/2017 | Lee | F01D 9/023 |
| 10,066,548 B2 | 9/2018 | Gilson et al. | |
| 2004/0045767 A1 | 3/2004 | Byrne et al. | |
| 2005/0109557 A1 * | 5/2005 | Dravet | B64D 29/00 181/292 |
| 2005/0274103 A1 | 12/2005 | Prasad et al. | |
| 2005/0284690 A1 * | 12/2005 | Proscia | F02C 7/045 181/214 |
| 2006/0037809 A1 | 2/2006 | Fuller et al. | |
| 2008/0296431 A1 * | 12/2008 | Ivers | B64D 33/02 244/1 N |
| 2009/0110541 A1 | 4/2009 | Southwick et al. | |
| 2009/0293481 A1 * | 12/2009 | Bethke | F02C 7/04 60/725 |
| 2010/0206664 A1 | 8/2010 | Bagnall | |
| 2010/0284788 A1 | 11/2010 | Brooks et al. | |
| 2010/0284789 A1 * | 11/2010 | Brooks | F01D 5/26 415/119 |
| 2011/0220433 A1 | 9/2011 | Nakamura et al. | |
| 2011/0266917 A1 | 11/2011 | Metzger et al. | |
| 2012/0124965 A1 * | 5/2012 | Grabowski | F02C 9/20 60/226.3 |
| 2014/0169935 A1 * | 6/2014 | Schwarz | F01D 5/225 415/1 |
| 2014/0233769 A1 | 8/2014 | Storm | |
| 2014/0366554 A1 | 12/2014 | Gilson et al. | |
| 2016/0076453 A1 * | 3/2016 | Richter | B64D 33/02 181/286 |
| 2016/0194968 A1 * | 7/2016 | Murphy | F02K 3/06 60/770 |
| 2016/0298847 A1 | 10/2016 | Nguyen et al. | |
| 2017/0022826 A1 * | 1/2017 | Read | F01D 5/28 |
| 2017/0058780 A1 | 3/2017 | Kim et al. | |
| 2018/0209345 A1 | 7/2018 | Fulayter et al. | |
| 2018/0258788 A1 | 9/2018 | Morin et al. | |
| 2018/0258854 A1 | 9/2018 | Sidelkovskly et al. | |
| 2018/0258855 A1 * | 9/2018 | Michaels | F01D 5/26 |
| 2018/0258857 A1 * | 9/2018 | Prasad | F02K 1/827 |
| 2018/0258955 A1 | 9/2018 | Levasseur et al. | |
| 2018/0258956 A1 * | 9/2018 | Marchaj | F02K 1/827 |

FOREIGN PATENT DOCUMENTS

| | | |
|---|---|---|
| EP | 2256302 A1 | 12/2010 |
| EP | 2466095 A2 | 6/2012 |
| EP | 3187713 A1 | 7/2017 |
| EP | 3333402 A1 | 6/2018 |
| GB | 2090334 A | 7/1982 |
| WO | 9213339 A1 | 8/1992 |
| WO | 2014189572 A2 | 11/2014 |

OTHER PUBLICATIONS

Mustafi, Prateek; "Improved Turbofan Intake Liner Design and Optimization"; Feb. 12, 2013; Theisis paper Faculty of Engineering and the Enviroment, Institute of Sound and Vibration Research; Univeristy of Southampton; 196 pages.
European Search Report for Application No. 18160541.1-1007; dated Jul. 19, 2018; 6 pgs.
European Search Report for Application No. 18160550.2-1007; dated Jul. 19, 2018; 7 pgs.
European Search Report for Application No. 18160554.4-1007; dated Jul. 19, 2018; 7 pgs.
European Search Report for Application No. 18160556.9-1007; dated Jul. 24, 2018; 7 pgs.
European Search Report for Application No. 18160559.3-1007; dated Jul. 24, 2018; 7 pgs.
European Search Report for Application No. 18160561.9; dated Jul. 4, 2018; 10 pgs.

* cited by examiner

ACOUSTICALLY DAMPED GAS TURBINE ENGINE

BACKGROUND

Exemplary embodiments pertain to flutter dampers in gas turbine propulsion systems and, more particularly, to flutter dampers in nacelle inlet structures.

Geared turbofan architectures, allow for high bypass ratio turbofans, enabling the use of low pressure ratio fans, which may be more susceptible to fan flutter than high pressure ratio fans. Fan flutter is an aeromechanical instability detrimental to the life of a fan blade.

Accordingly, there is a need for a flutter damper which, by absorbing the acoustic energy associated with the flutter structural mode, may prevent the fan from fluttering, and which may be integrated into the reduced available space in an optimized propulsion system.

BRIEF DESCRIPTION

Disclosed is a gas turbine engine including: a fan; a nacelle including a flutter damper disposed forward of the fan, the flutter damper including: an acoustic liner having a perforated radial inner face sheet and a radial outer back sheet, the acoustic liner being configured for peak acoustical energy absorption at a frequency range that is greater than a frequency range associated with fan flutter; a chamber secured to the radial outer back sheet, the chamber being in fluid communication with the acoustic liner, and the chamber being configured for peak acoustical energy absorption at a frequency range that is associated with one or more fan flutter modes; and wherein (i) the nacelle and a core cowl form a bypass duct, the bypass duct forming a convergent-divergent fan exit nozzle; (ii) the gas turbine engine includes a variable area fan nozzle capable of being in an opened position and a closed position, wherein the opened position has a larger fan exit area than the closed position; and/or (iii) the fan is a shrouded fan.

Further disclosed is a method of reducing fan flutter in a gas turbine engine, including dampening acoustics with flutter damper disposed in a nacelle, the flutter damper being forward of a fan, the flutter damper including an acoustic liner having a perforated radial inner face sheet and a radial outer back sheet, the acoustic liner being configured for peak acoustical energy absorption at a frequency range that is greater than a frequency range associated with fan flutter, a chamber secured to the radial outer back sheet, the chamber being in fluid communication with the acoustic liner, and the chamber being configured for peak acoustical energy absorption at a frequency range that is associated with one or more fan flutter modes, and wherein (i) the method includes decreasing output pressure with a convergent-divergent fan exit nozzle formed in a bypass duct between a nacelle and a core cow; (ii) the method includes decreasing output pressure with a variable area fan nozzle in an opened position, wherein the opened position has a larger fan exit area than a closed position; and/or (iii) the fan being a shrouded fan.

Further disclosed is a method of reducing fan flutter in a gas turbine engine, including installing a flutter damper in a nacelle duct, the flutter damper being forward of the fan, the flutter damper including an acoustic liner having a perforated radial inner face sheet and a radial outer back sheet, the acoustic liner being configured for peak acoustical energy absorption at a frequency range that is greater than a frequency range associated with fan flutter, a chamber secured to the radial outer back sheet, the chamber being in fluid communication with the acoustic liner, and the chamber being configured for peak acoustical energy absorption at a frequency range that is associated with one or more fan flutter modes, and applying a gas flow to the gas turbine engine, detecting fan flutter with the fan blades at a first angle relative to inlet flow, and advancing a blade angle and determining for the fan blades a second angle relative to inlet flow at which flutter is reduced, the second angle defining a closed angle for the fan blades relative to the first angle.

In addition to one or more of the features described above, or as an alternative, further embodiments may include that the fan operates within a flutter margin of between 2% and 10%. In addition to one or more of the features described above, or as an alternative, further embodiments may include that the fan blades have a mean roughness of less than about 28 Ra. In addition to one or more of the features described above, or as an alternative, further embodiments may include that the flutter damper has an impedance characteristic at one or more target frequencies defined as: $f_{target}=f_{S,ND}+\Omega \cdot ND$ wherein $f_{S,ND}$ is a resonance frequency corresponding to a structural mode of a rotating component; ND is a nodal diameter count of the structural mode; and $\Omega$ is a rotational speed of the rotating component; and wherein the flutter damper has the following impedance characteristic at the one or more targeted frequencies: $R \geq 2\rho c - 3\rho c \leq X \leq -0.6\rho c$ wherein R is the real part of the impedance characteristic, X is the imaginary part of the impedance characteristic, $\rho$ is air density, and c is speed of sound.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
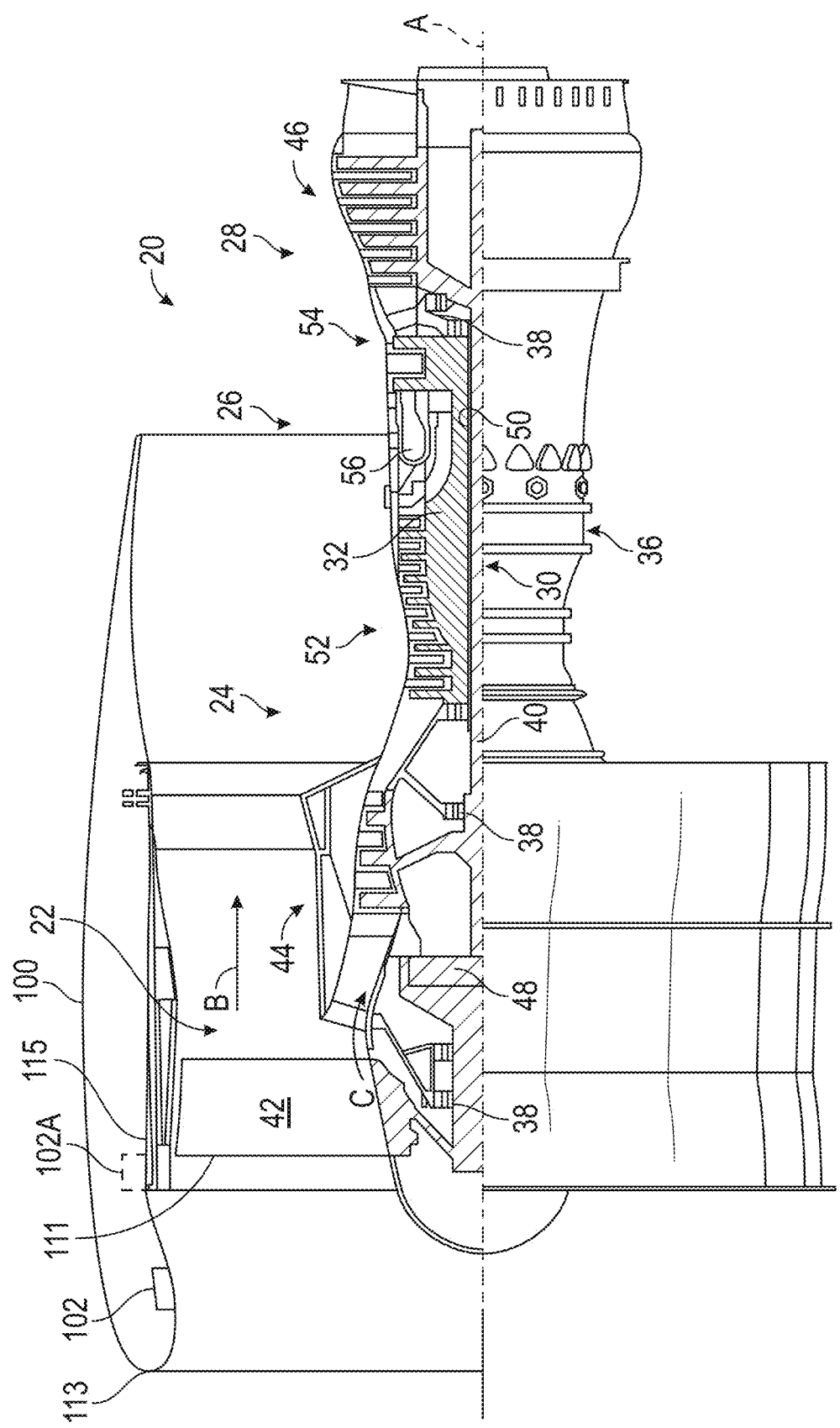
FIG. 1 is a schematic view of a gas turbine propulsion system.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via multiple bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
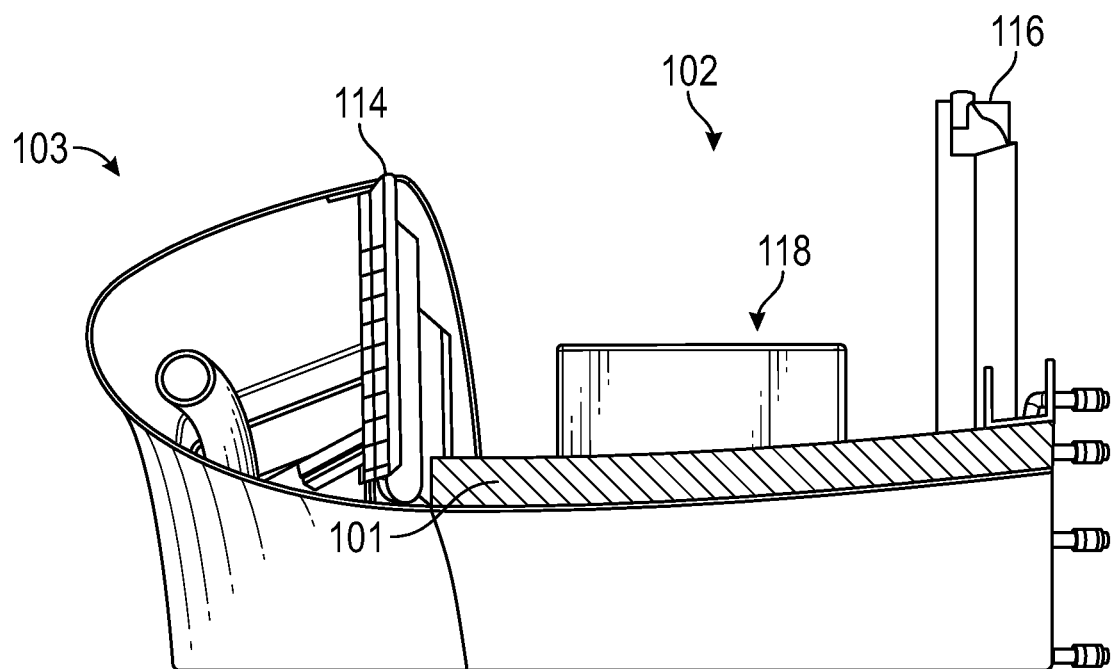
FIG. 2 illustrates a perspective cross sectional view of a flutter damper in a nacelle inlet.
Figure 3:
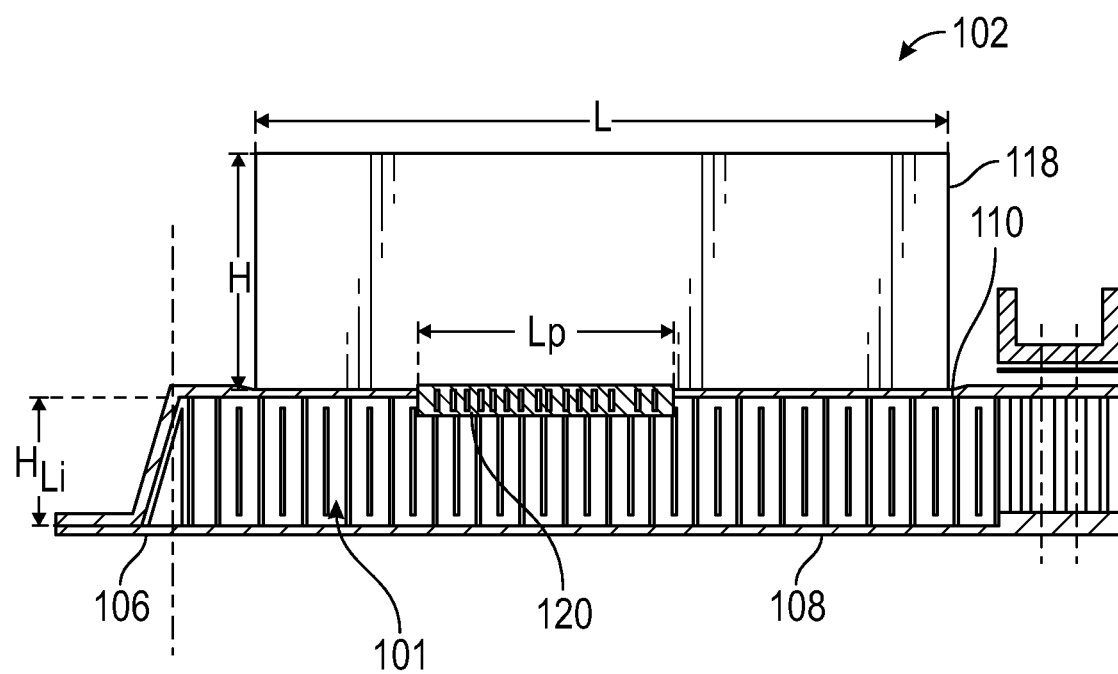
FIG. 3 is a schematic view of a flutter damper in accordance with one embodiment of the disclosure.

As illustrated in FIGS. 1 through 3, the engine 20 may include a nacelle 100 with acoustic liner 101 at the radial inside of the nacelle inlet skin 106. The acoustic liner 101 may have a perforated radial inner face sheet 108, i.e., facing a radial inside of a nacelle inlet 103, illustrated in FIG. 2, and a radial outer back sheet 110.

The acoustic liner 101 is designed to absorb energy that tends to produce community noise. As such, for contemporary high bypass ratio propulsion systems, the acoustic liner 101 typically provides for peak energy absorption in the acoustic frequency range of about between 500 and 2000 Hz, and is less effective outside this range. Fan flutter for such propulsion systems, however, typically occurs at a lower frequency, depending on the frequency and nodal diameter count of the critical structural mode. The structural frequency largely depends on the size of the fan, among other design parameters. Large fans tend to flutter at smaller frequencies than small fans. Torsion modes tend to have higher frequency than bending modes on any given fan, and either can be critical. The materials and construction techniques used to make the fan blades also have a significant influence on the frequency. Given the range of sizes, materials, and flutter critical modes in fans of modern gas turbine engines, the flutter frequency will typically occur at a frequency range of less than but not equal to 500 Hz, and more specifically between 50 and 400 Hz, yet more specifically between 50 and 300 Hz, and yet more specifically between 50 and 200 Hz.

In one embodiment, a flutter damper 102 is provided which may include the acoustic liner 101 and a chamber 118 disposed radially exterior to and in acoustic communication with the acoustic liner 101. Also a flutter damper 102 without the acoustic liner 101 is considered part of the scope of this disclosure. As used herein, radially refers to the axis A of the engine 20. Acoustic communication is provided through a perforation section 120 in the outer back sheet 110. In FIG. 2, the flutter damper 102 is illustrated as being disposed between a first axial forward nacelle bulkhead 114 and a second axial forward nacelle bulkhead 116. The flutter damper 102, however, may be disposed anywhere between a leading edge 111 of the fan 42 and a nacelle hilite 113, such as flutter damper 102A disposed on the fan case 115 illustrated in FIG. 1.

The flutter damper 102 may be configured to mitigate fan flutter by providing peak energy absorption in the acoustic frequency range associated with fan flutter modes, where such frequency range is referred to herein as a flutter frequency range. The flutter damper may have desirable impedance characteristics at certain targeted flutter frequencies, which may be defined as:

$$f_{target} = f_{S,ND} + \Omega \cdot ND$$

In the equation above, the variable $f_{S,ND}$ is the frequency, which is measured in units of Hertz, and which corresponds to a resonance frequency of a structural mode of the fan blade, which typically may be a first or second bending mode with a certain nodal diameter count, ND. The variable ND is the nodal diameter count of the circumferential pattern of the structural mode of the fan blade. The variable $\Omega$ is the rotational speed of the fan, which is measured in the units of revolutions per second. The values for variable $\Omega$ may be chosen to correspond to conditions where fan flutter may typically occur, for example, when the tip relative Mach number of the fan is between 0.85 and 1.2 during standard-day, sea-level-static operation.

From the above equation, considering the nodal diameter constraints, the targeted flutter frequency ranges may be defined to be:

$f_{S,ND}$ = frequency of first or second bending mode of fan with ND nodal diameters $1 \leq ND \leq 3$ $\Omega_{Mreltip=0.85} \leq \Omega \leq \Omega_{Mreltip=1.2}$ $$f_{target} = f_{S,ND} + \Omega \cdot ND$$

In the above equation, Mreltip is the tip relative Mach number for a radial outer tip of the fan blade, and the bending mode is a vibrational mode of the fan blade. The symbol $\Omega_{Mreltip=0.85}$ denotes the rotational speed where the tip relative Mach number is equal to 0.85; likewise, $\Omega_{Mreltip=1.2}$ denotes the rotational speed where the tip relative Mach number is equal to 1.2, Of course, values greater or lesser than the aforementioned values are considered to be within the scope of the present disclosure.

Within the flutter frequency ranges associated with the first and second bending mode, and more specifically at the targeted frequencies, the flutter damper may have the following impedance characteristics:

$R \geq 2\rho c$ $-3\rho c \leq X \leq -0.6\rho c$

Again, these values may vary and fall within the scope of the present disclosure. The above equation references the impedance of the flutter damper, defined as the complex ratio of the amplitude and phase of pressure oscillations over the amplitude and phase of the acoustic velocity as a function of frequency. In addition, the equation references the real part of impedance is the resistance, which is variable R, and the imaginary part of impedance is the reactance, which is variable X. The variable $\rho$ is the air density, and the variable c is the sound speed, both being at the entrance to the flutter damper. The resistance constraint on R may facilitate integration of the flutter damper into acoustic liners, which typically have R values greater than $2\rho c$ in locations forward of the fan. The reactance constraint on X optimizes the flutter inhibiting capability of the device at operating conditions typically encountered in commercial aircraft applications. At certain target frequencies, the flutter damper may satisfy the following additional constraint:

$$0.0143 \leq \frac{V f_{target}}{Sc} \leq 0.165$$

Figure 4A:
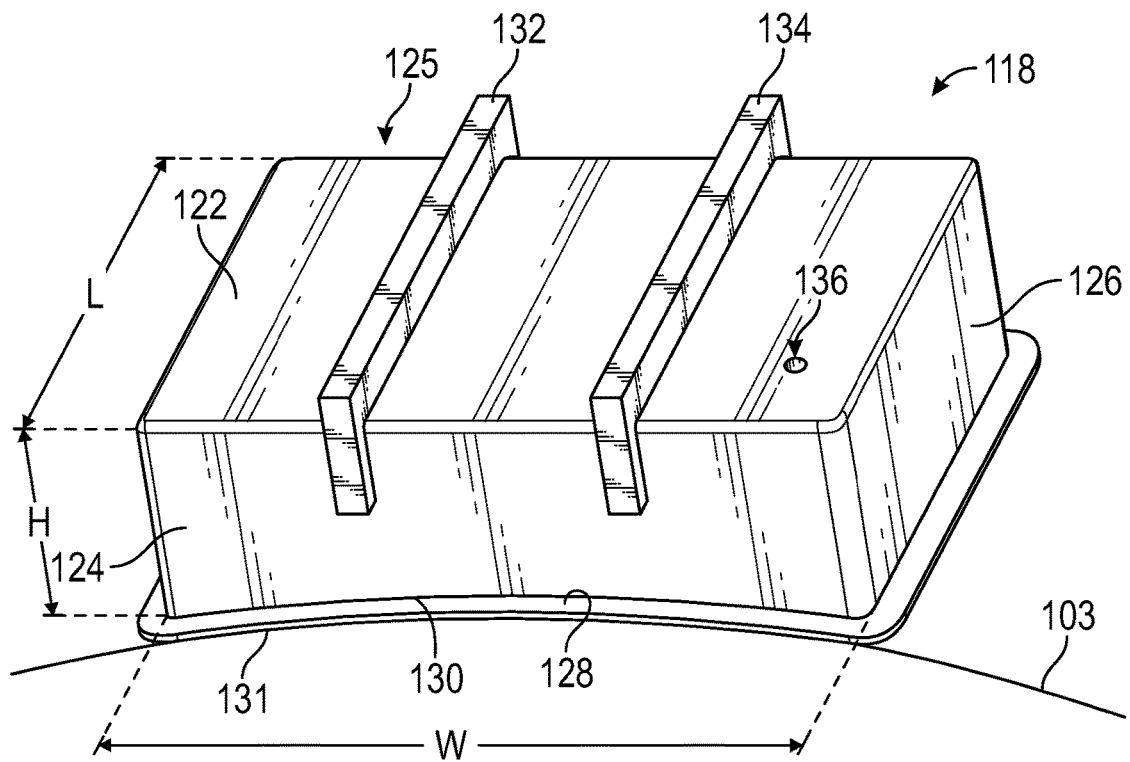
FIGS. 4A and 4B illustrate perspective views of one chamber of a flutter damper in accordance with one embodiment of the disclosure.
Figure 4B:
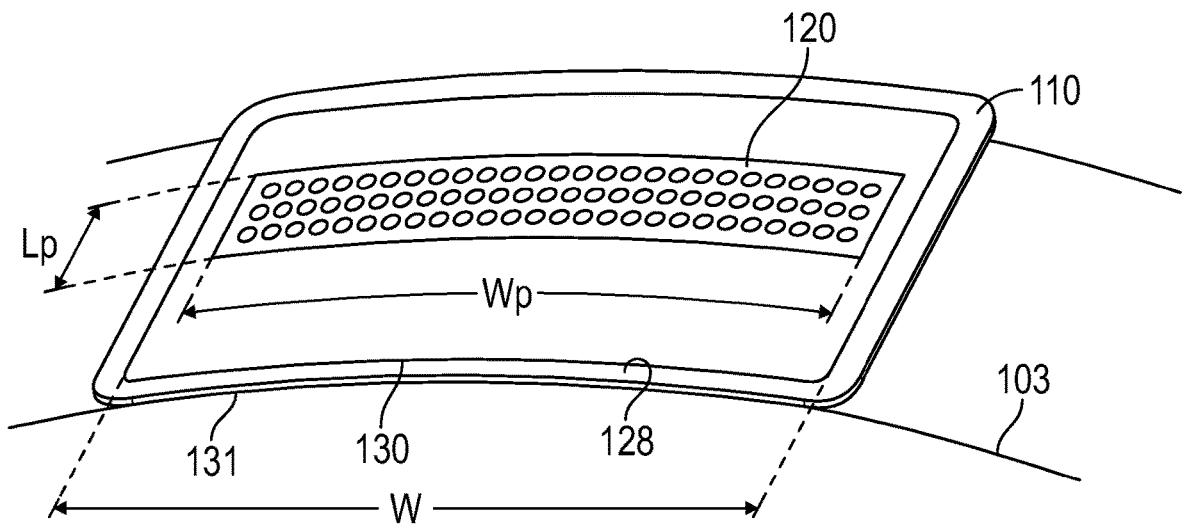

Again, these values may vary and fall within the scope of the present disclosure. As illustrated in FIGS. 3, 4A and 4B, discussed in greater detail below, the chamber 118 has a width W, a height H, and a length L. In addition, the perforated section 120 disposed under the chamber 118 has a width Wp and a length Lp, and the acoustic liner 101 has a height $H_{Li}$. Thus, in the above equation, the volume of the flutter damper 102, which includes the volume (W×H×L) of chamber 118 and the volume (Wp×$H_{Li}$×Lp) of the acoustic liner 101 is variable V. The area of the perforated section 120 (Wp×Lp) disposed under the chamber 118 is variable S. The units of V, S, c and $f_{target}$ are chosen such that $$\frac{V f_{target}}{Sc}$$

is non-dimensional.

Moreover, in one embodiment, a downstream edge of the chamber 118 may be located at B/D≤0.35. In this equation, the variable B is the distance between the downstream edge of the chamber 118 and the fan tip leading edge, and the variable D is the fan tip diameter at the leading edge of the fan blade.

Remaining with FIGS. 1-3, the illustrated flutter damper 102 designed according to the above constraints, has the benefit of being able to fit within smaller footprints of sized-optimized propulsion systems, providing a retrofittable solution to an existing engine inlet. Thus the disclosed flutter damper 102 may help boost fan flutter margin without requiring an inlet redesign. In addition, the flutter damper 102 may provide a relatively lightweight solution, that is, the low temperatures of the inlet area may allow for the use of a metallic material, including aluminum, or a plastic or a composite, or a hybrid metallic and non-metallic material. Moreover, the flutter damper 102 may have a scalable design which can be oriented in an array of chambers, discussed in detail, below, and as illustrated in at least FIG. 5. For example, the array of chambers and may be placed around an engine inlet circumference to achieve a desired amount of flutter dampening volume.

As illustrated in FIGS. 4A and 4B, the perforation section 120 in the outer back sheet 110 may be rectangular in shape with length Lp and width Wp, where the length direction Lp corresponds to the engine axial direction, and the width direction Wp corresponds to the engine circumferential direction. For a contemporary high bypass ratio propulsion system, which may have a fan diameter of about 80 inches, and a fan rotor hub-to-tip ratio of about 0.3, the length Lp may be about four and half (4.5) inches for the chamber 118, and the width Wp may be about twelve (12) inches for chamber 118. Each perforation section 120 may have a hole-diameter of about thirty thousandths (0.030) of an inch. Of course, dimensions greater or lesser than the aforementioned dimensions, and non-rectangular shapes are considered to be within the scope of the present disclosure. This perforation geometry provides an open area that may be about four and half (4.5) percent of the surface area (Lp× Wp) of the chamber 118 against the outer back sheet 110, which may be the same open area as a perforation section (not illustrated) in the inner face sheet 108. Again, these dimensions may vary and remain within the scope of the present disclosure.

The chamber 118 may be sized to optimally dampen fan flutter at a specific fan flutter frequency and nodal diameter. The nodal diameter count represents the nodal lines of vibrational modes observed for the fan blade, which typically may be between 1 and 3. The chamber 118 in FIG. 2, for example, is shaped as a rectangular box, and non-rectangular shapes are also within the scope of the disclosure, and may be sized based on an observed flutter frequencies and nodal diameters for a given engine. For example, if an engine has an observable flutter mode at a frequency of about 150 Hz with nodal diameter 2, the chamber 118 may be sized according to that flutter mode and nodal diameter.

The box shape, as illustrated in FIG. 4A, may have a top surface 122 roughly defined by a width-length (W×L) area, where the length direction L corresponds to the engine axial direction, and the width direction W corresponds to the engine circumferential direction. The box shape may also have a front surface 124 and a back surface 125, each roughly defined by a height-width (H×W) area, where the height direction H for the chamber 118 may correspond to an engine radial direction. The box shape may further have a side surface 126 roughly defined by a height-length (H×L) area. Again, these dimensions may vary and remain within the scope of the present disclosure.

For the exemplary embodiment, the chamber 118 is twelve (12) inches wide, as referenced above, and the chamber width-height-length (W×H×L) volume may be three hundred twenty four (324) cubic inches, and the height H may be equal to, or less than, six (6) inches.

Turning now to FIGS. 4A and 4B, the box shaped chamber 118 may have a bottom edge 128 that geometrically conforms to the annular and axial profile shape of the nacelle inlet 103. Extending axially and circumferentially outwardly from the bottom edge 128 of the chamber 118 is a mounting flange 130 for affixing the chamber 118 to an existing nacelle inlet 103. As such, the bottom face 131 of the chamber 118 may be formed by the radial outer back sheet 110 of the acoustic liner 101.

The chamber 118 may also include first and second stiffening structures 132, 134. The stiffening structures 132, 134 may have a substantially "C" shape, when viewing into the side surface 126 of the chamber 118, which protrudes outwardly from the top 122, front 124 and back 125 surfaces of the chamber 118. The stiffening structures 132, 134 may divide the top surface 122 of the chamber 118 in substantially equal portions in the width direction W. The stiffening structures 132, 134 may tune the structural resonance frequencies of the chamber 118 away from the fan flutter frequencies to avoid fan flutter inducing resonance in the chamber 118. For example, the stiffening structures 132, 134 may tune the structural resonance frequencies of the relatively large, flat top surface 122 of the chamber 118 out of the targeted flutter frequency range. In addition, the stiffening structures 132, 134 add structural rigidity and may allow for a lightweight design of the chamber 118.

One or more weep holes 136 may be provided to allow for water or fluid egress. The placement of the weep holes 136 is selected to be below the engine centerline.

Figure 5:
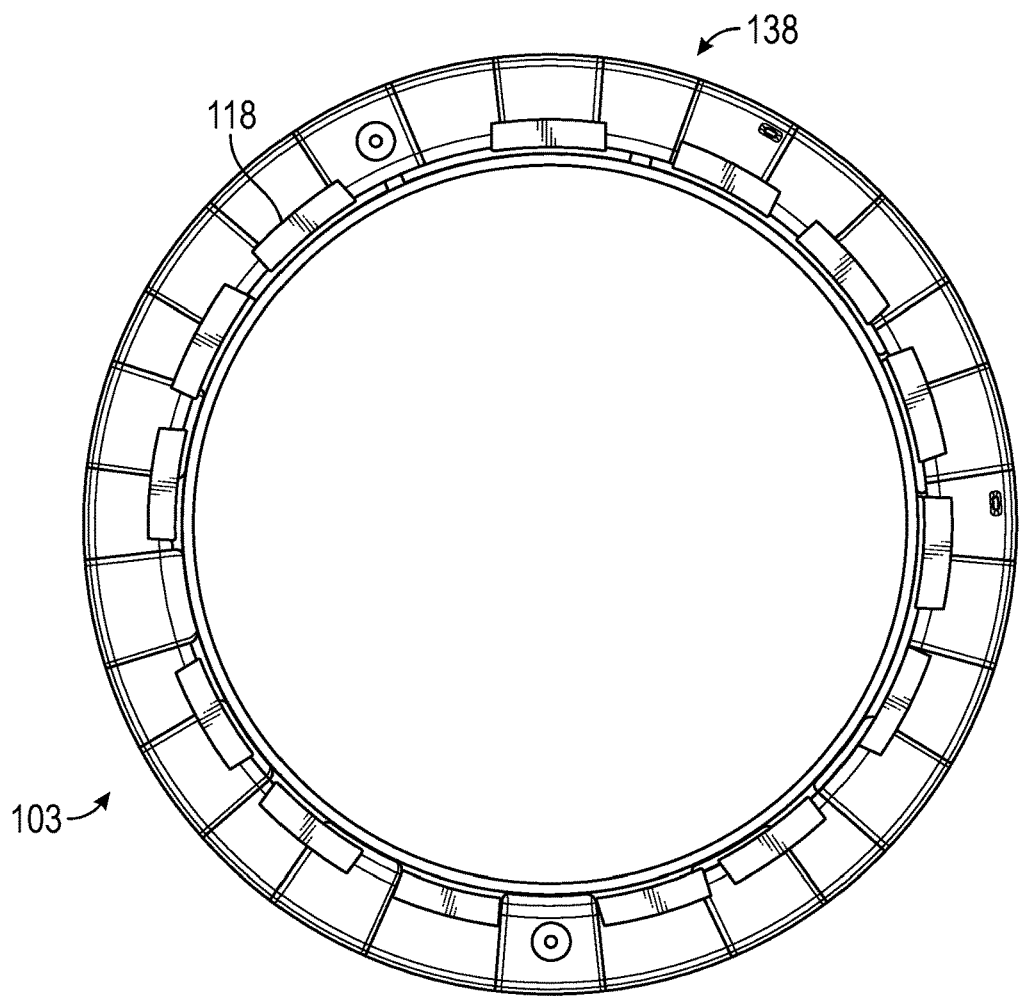
FIG. 5 illustrates an array of chambers of flutter dampers integrated into the nacelle inlet.
Figure 6:
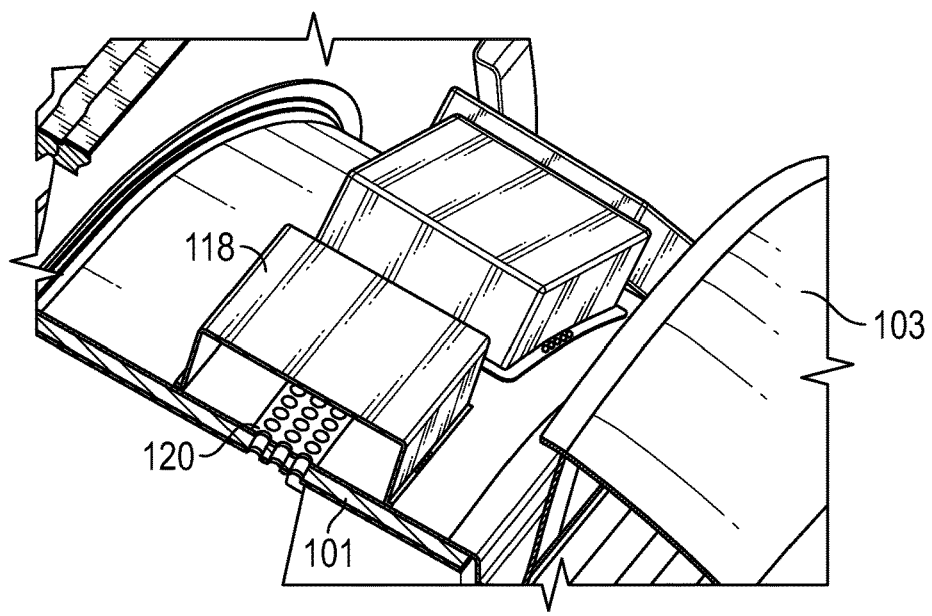
FIG. 6 is a perspective view of a portion of the nacelle inlet.

Turning now to FIGS. 5 and 6 a circumferential array 138 of chambers 118, including fourteen (14) chambers 118, is disposed about the nacelle inlet 103, with each of the chambers 118 having a perforated section. Disposing the chambers 118 in this type of circumferential array 138 achieves a desired damping volume.

Figure 7:
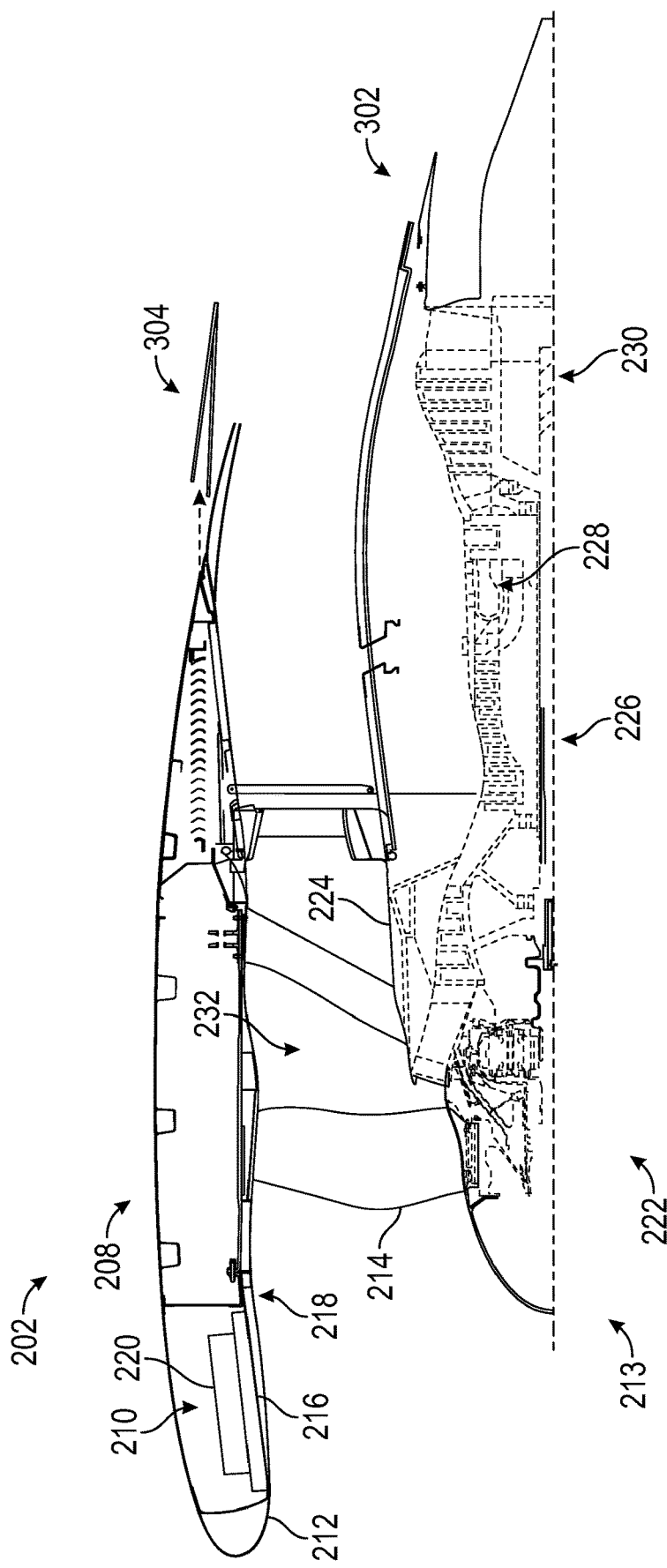
FIG. 7 illustrates a gas turbine engine according to an embodiment.
Figure 8:
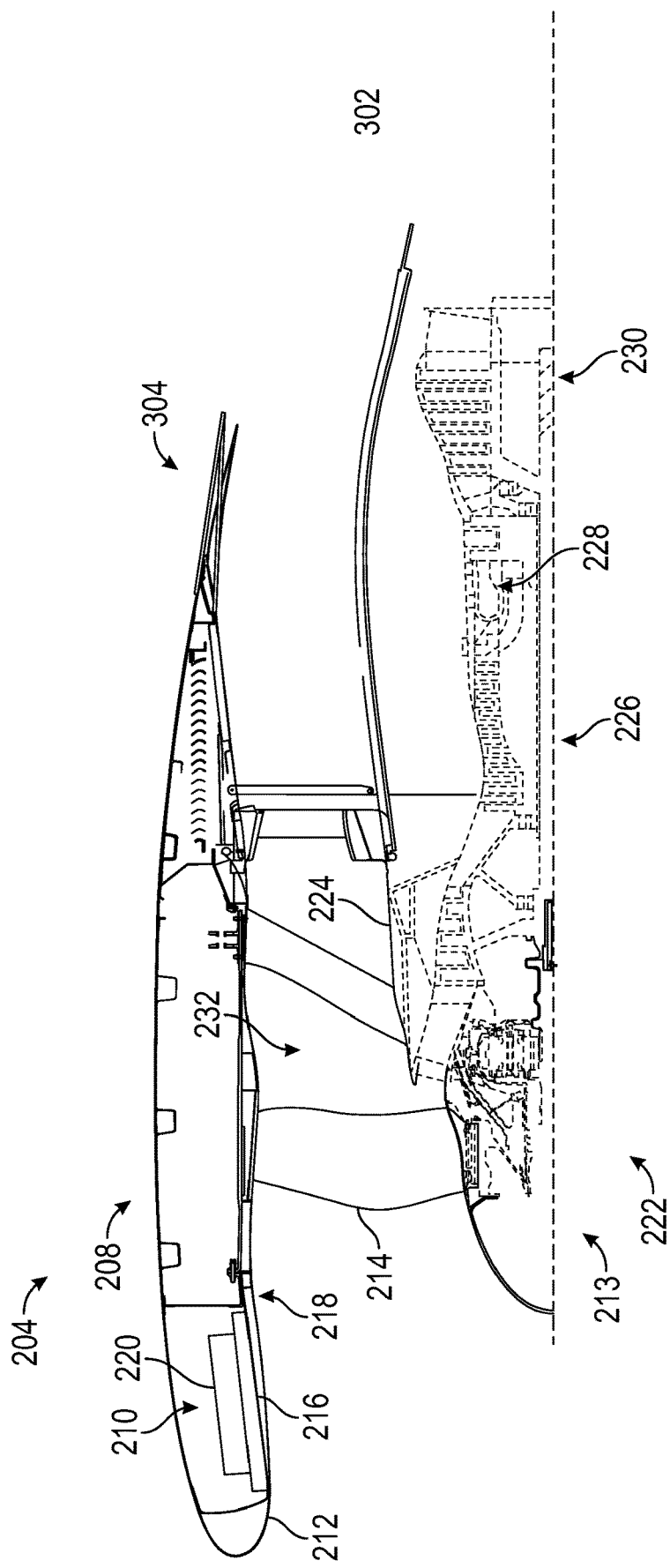
FIG. 8 illustrates a gas turbine engine according to an embodiment.
Figure 9:
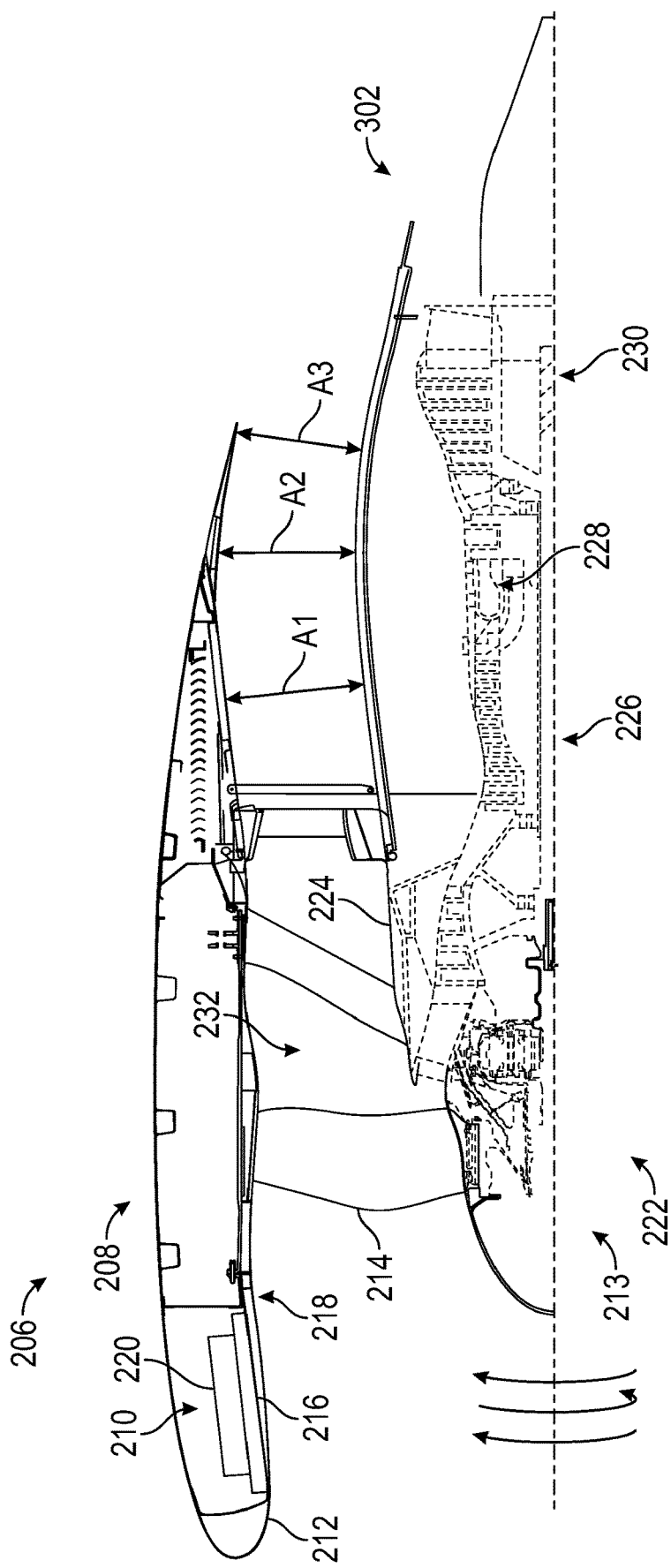
FIG. 9 illustrates a gas turbine engine according to an embodiment.

Turning now to FIGS. 7-9, three embodiments of a gas turbine engine 202, 204, and 206 are illustrated. Each of the three embodiments may include a nacelle 208 fitted with an acoustic damper 210. The acoustic damper 210 may be located axially between a hilite 212 disposed at an engine inlet 213 and a fan 214. As above, the acoustic damper 210 may have an acoustic liner 216 located against an inlet-flow facing surface 218. The acoustic damper 210 may also include a resonator chamber 220 located radially outside of the liner 216.

Radially within the nacelle 208, the engines 202, 204, 206 may include an engine core 222 surrounded by an engine core cowl 224. The engine core 222 may include a compressor module 226, a combustor 228 and a turbine module 230. A core bypass area 232 may be located radially between the cowl 222 and the flow facing surface 218 of the nacelle 208. The bypass area 232 in the illustrated embodiments may be a high-bypass area.

Figure 10:
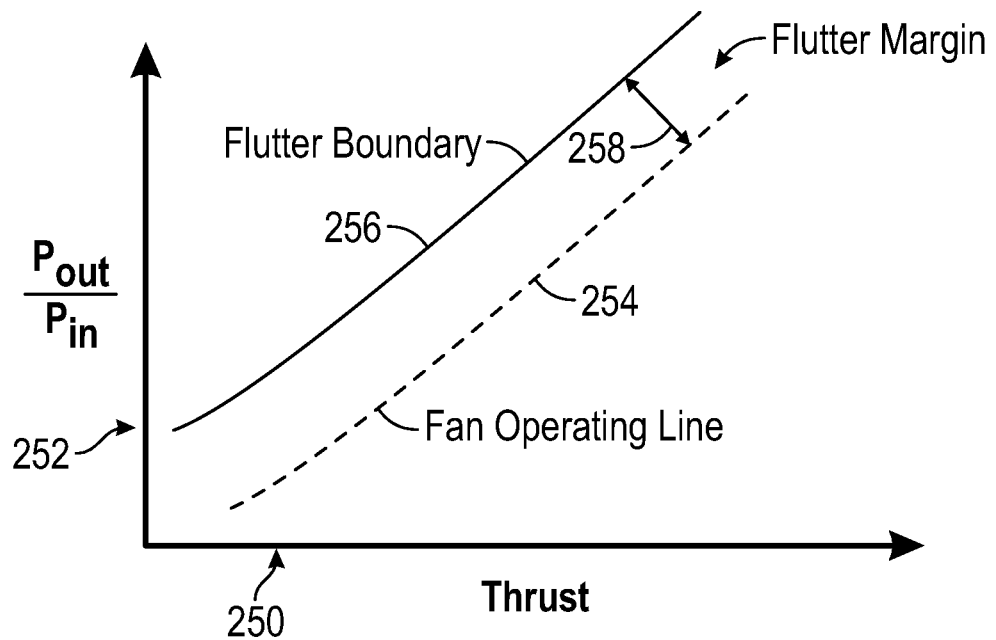
FIG. 10 illustrates a graph of certain engine design parameters.

FIG. 10 illustrates a graph of thrust on the abscissa 250 and a ratio of output pressure to input pressure on the ordinate 252 for a constant outlet area gas turbine engine. As illustrated in FIG. 10, output pressure may increase as thrust increases for normal fan operation conditions. The bottom curve 254 is a fan operating curve for a thrust target range. For a given thrust target, the top curve 256 illustrates the occurrence of fan flutter, i.e., blade radial outer tips bending in the axial forward direction. Fan flutter may occur if output pressure increases over input pressure by small margin 258 over the fan's operating parameters.

Flutter may be realized during intervals of high engine thrust, e.g., during takeoff and climb. In addition, the flutter margin 258 may decrease as the fan blade becomes impacted by increased leading edge roughness, decreased blade cleanness, and compromised blade clearances, all of which may occur during normal use. The margin for a blade is closer to optimal when the blade is newly manufactured. For commercial aircraft, it is not uncommon to require a newly manufactured or refinished surface texture mean roughness of all airfoil surfaces to be less than 28 Ra (Roughness Average). Additional factors which may impact the flatter margin include engine thrust deflections, cross winds, and other aerodynamic and mechanical factors.

As illustrated in FIG. 10, reducing output pressure, e.g., during takeoff, may reduce the likelihood of fan flutter during that flight phase. Output pressure may be reduced by increasing output area 302, as illustrated in FIG. 7 with a variable area fan nozzle 304. A variable area fan nozzle 304 may pivot and/or move axially rearward to increase the output area. Another option to reduce output pressure, as illustrated in FIG. 8, may be to permanently fix the variable area fan nozzle 304 in semi-opened state. Yet another option to reduce output pressure, as illustrated in FIG. 9, may be to design the nacelle 208 and/or engine cowl 224 so that the engine bypass 232, downstream of the fan 214, forms a convergent-divergent nozzle. That is, a first bypass area A1, e.g., axially at the compressor module 226, may be larger than a second bypass area A2, e.g., axially at the combustor module 228. A third bypass area A3, e.g., axially at the turbine module 230 may also be larger than the second bypass area A2. Mathematically, this area relationship may be represented as A1>A2; A2<A3.

Figure 11:
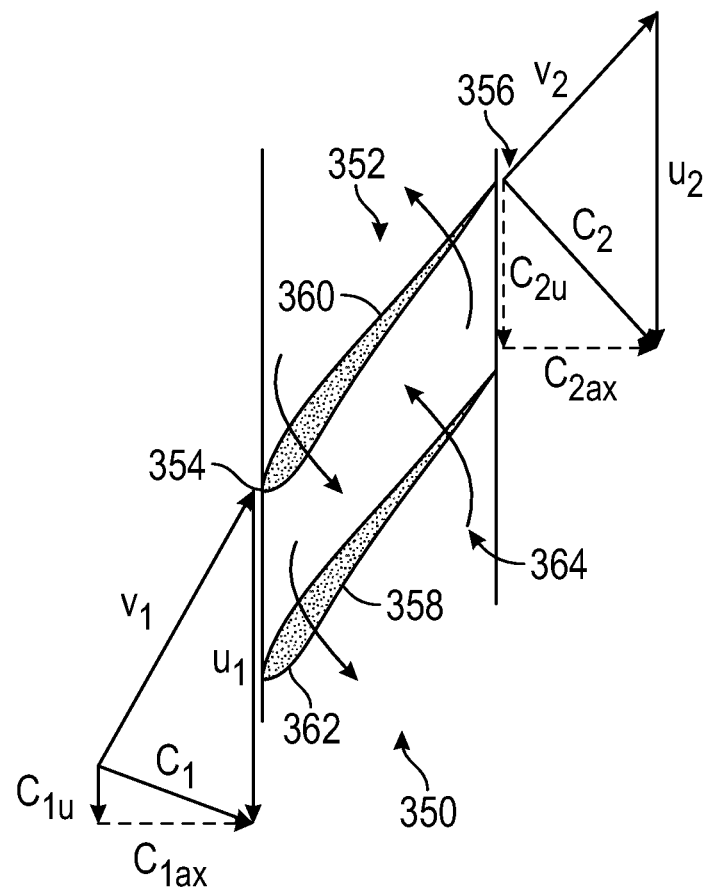
FIG. 11 illustrates fan blades according to an embodiment.

FIG. 11 illustrates another option which may lower output pressure. Two blades 350, 352 of the fan are illustrated. At the leading edge 354 and trailing edge 356 of one of the blades 352, force triangles are provided illustrating absolute velocities V1, V2, blade velocities U1, U2, relative velocities C1, C2, axial flow velocities C1AX, C2AX and swirl velocities C1U, C2U. Closing the blades 350, 352 means that, relative to a more efficient configuration, the blades 350, 352 are turned around each blade radial center 358, 360, pursuant to arrows 362, 364. The resulting origination of the blades 350, 352 increases the amount of blade surface area facing the nacelle inlet flow, which decreases flow velocities, C1AX, C2AX, and may lower output pressure.

Figure 12:
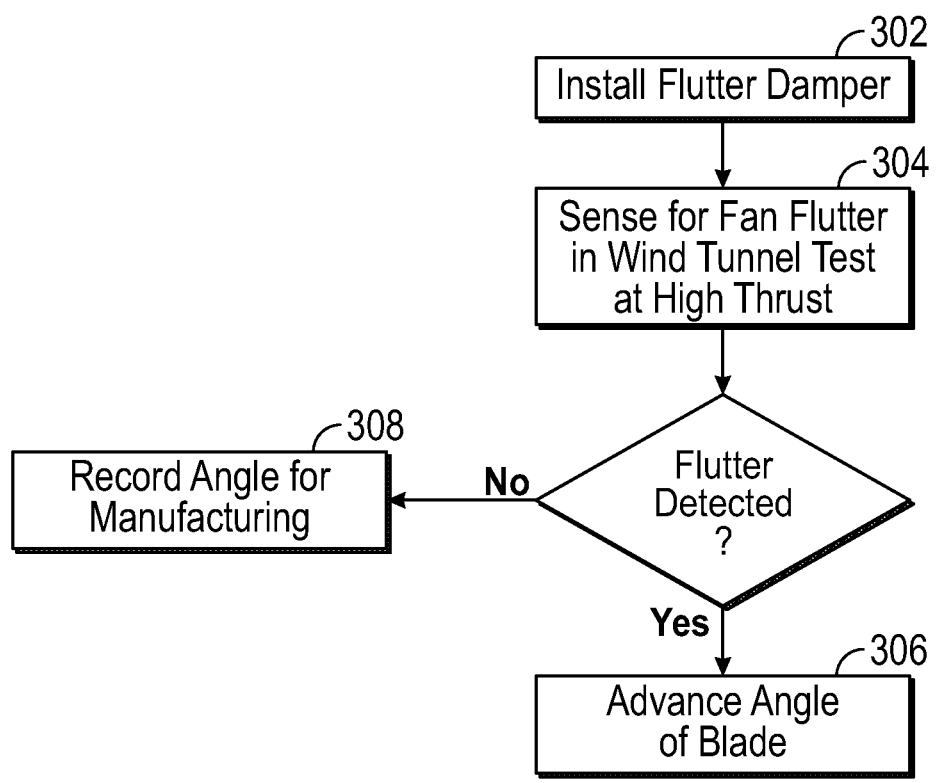
FIG. 12 illustrates a method for mitigating fan flutter.

A determination of the closing angle can be made by installing flutter dampers into an engine known to experience fan flutter, and wind tunnel testing the engine until flutter ceases. The close angle obtained with the installation of the flutter damper will be smaller than without such installation, and the engine will run more efficiently. For example, as illustrated in FIG. 12, flutter dampers are installed into an engine in STEP 302. Then sensors are attached to detect fan flutter with the engine set at high thrust to simulate takeoff at STEP 204. When fan flutter is detected, the blade angle is advanced to a closed position, e.g., one degree per advancement. Once flutter has ceased, the angle is recorded. This angle is used to manufacture blades that can withstand flutter in high thrust conditions. The close angle will be less than with a similarly tested engine in which the flutter damper is not installed. As a result, the engine will run more efficiently.

Figure 13:
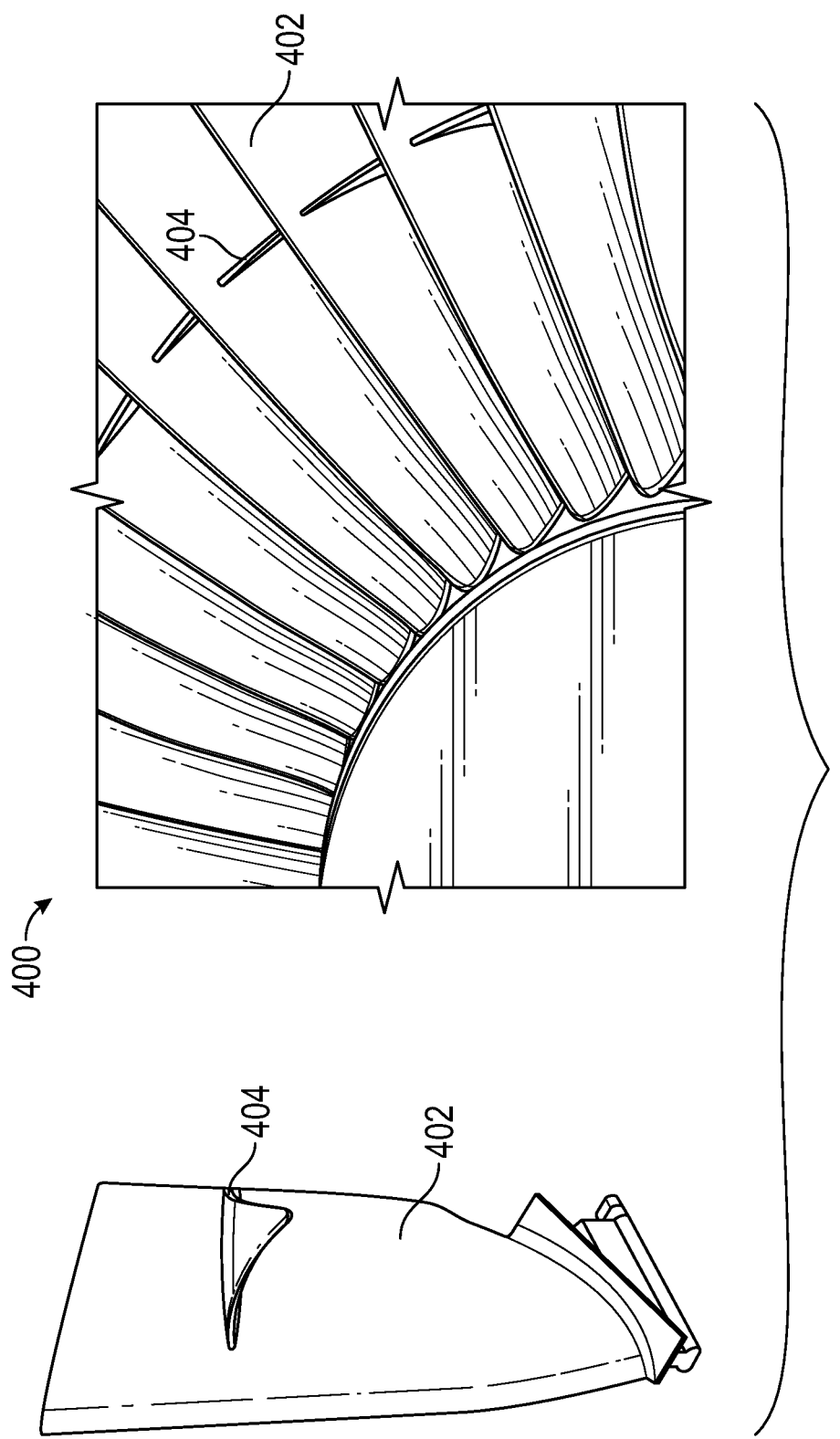
FIG. 13 illustrates fan blades according to an embodiment.

FIG. 13 illustrates another option which may lower output pressure. Fan blades 400, e.g., blade 402, may be connected in part via a radial mid-span shroud 404. The shroud 404 may enable the use of more blades 400 having a shorter cord length than an unshrouded blade configuration. The shorter cord length in the shrouded blade provides less skin friction drag per blade than the unshrouded blade. The inherently lower output pressure of the shrouded blade would provide a larger flutter margin. Thus, the installation of the flutter damper would further prolong the onset of flutter, prolong periods of time between blade surface refurbishing, and lengthen the useful life of a blade.

Each of the solutions in FIGS. 7-13 provide a solution which reduces the likelihood of fan flutter without making more robust mechanical changes to the engine that are otherwise required to reduce output pressure. As a result, the efficiency of the engines 202, 204, 206 may increase, which may reduce fuel consumption, community noise, and engine wear.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:

a fan;

a nacelle including a flutter damper disposed forward of the fan, the flutter damper comprising:

an acoustic liner having a perforated radial inner face sheet and a radial outer back sheet, wherein a perforated section is defined by perforations in the radial outer back sheet, the acoustic liner being configured for peak acoustical energy absorption at a frequency range that is greater than a frequency range associated with fan flutter;

a circumferential array of chambers secured around a circumference of a nacelle inlet, the chambers being circumferentially spaced from one another and cumulatively achieving a desired dampening volume, each of the chambers being secured to the radial outer back sheet, and being in fluid communication with the acoustic liner, each of the chambers configured so that the perforated section is disposed thereunder and has a width $W_p$, a length $L_p$ and a height corresponding to a height of the acoustic liner $H_{Li}$, wherein $L_p$ is defined along an engine axial direction, and each of the chambers defining a rectangular box with a front surface, a back surface, opposing side surfaces, and a bottom edge extending axially and circumferentially outwardly from each of the surfaces to define a mounting flange that geometrically conforms to an annular and axial profile of the nacelle inlet and that mounts each of the chambers to the nacelle inlet, whereby a bottom surface of each of the chambers is formed by the radial outer back sheet, and wherein each of each of the chambers has a width W, a length L, and a height H, wherein L is defined along the engine axial direction, wherein an acoustic volume V of the flutter damper is a sum of $W_p \times H_{Li} \times L_p$ and $W \times H \times L$, and wherein the perforated section and each of the chambers is configured so that $L > L_p$ within each of the chambers, and each of the chambers is configured for peak acoustical energy absorption at a frequency range that is associated with one or more fan flutter modes; and wherein:

(i) the nacelle and a core cowl form a bypass duct, the bypass duct forming a convergent-divergent fan exit nozzle; and/or (ii) the gas turbine engine includes a variable area fan nozzle, the variable area fan nozzle is capable of being in an opened position and a closed position, wherein the opened position has a larger fan exit area than the closed position; and/or (iii) the fan is a shrouded fan.

2. The gas turbine engine of claim 1, wherein the fan operates within a flutter margin of between 2% and 10%.

3. The gas turbine engine of claim 2, wherein blades of the fan have a mean roughness of less than about 28 Ra.

4. The gas turbine engine of claim 1, including a variable area fan nozzle, and wherein the variable area fan nozzle is fixed in a semi-opened state.

5. The gas turbine engine of claim 4, wherein the fan operates within a flutter margin of between 2% and 10%.

6. The gas turbine engine of claim 5, wherein blades of the fan have a mean roughness of less than about 28 Ra.

7. The gas turbine engine of claim 4, wherein:
the flutter damper has an impedance characteristic at one or more target frequencies defined as:

$$f_{target} = f_{S,ND} + \Omega \cdot ND$$

wherein
$f_{S,ND}$ is a resonance frequency corresponding to a structural mode of a rotating component;
ND is a nodal diameter count of the structural mode; and
$\Omega$ is a rotational speed of the rotating component; and
wherein the flutter damper has the following impedance characteristic at the one or more targeted frequencies:

$$R \geq 2\rho c$$

$$-3\rho c \leq X \leq -0.6\rho c$$

wherein R is the real part of the impedance characteristic, X is the imaginary part of the impedance characteristic, $\rho$ is air density, and c is speed of sound.

8. The gas turbine engine of claim 1, wherein:
the flutter damper has an impedance characteristic at one or more target frequencies defined as:

$$f_{target} = f_{S,ND} + \Omega \cdot ND$$

wherein
$f_{S,ND}$ is a resonance frequency corresponding to a structural mode of a rotating component;
ND is a nodal diameter count of the structural mode; and
$\Omega$ is a rotational speed of the rotating component; and
wherein the flutter damper has the following impedance characteristic at the one or more targeted frequencies:

$$R \geq 2\rho c$$

$$-3\rho c \leq X \leq -0.6\rho c$$

wherein R is the real part of the impedance characteristic, X is the imaginary part of the impedance characteristic, $\rho$ is air density, and c is speed of sound.

\* \* \* \* \*